United States Patent [19]
Souda et al.

[11] Patent Number: 5,355,249
[45] Date of Patent: Oct. 11, 1994

[54] OPTICAL PASSIVE COMPONENTS

[75] Inventors: Hironori Souda, Hirakata; Masaaki Tojo, Nara; Noboru Kurata, Ikoma, all of Japan

[73] Assignee: Matsushita Electric Industrial Co., Ltd., Osaka, Japan

[21] Appl. No.: 49,459

[22] Filed: Apr. 20, 1993

[30] Foreign Application Priority Data

| Apr. 21, 1992 | [JP] | Japan | 4-100834 |
| Jul. 8, 1992 | [JP] | Japan | 4-180841 |
| Nov. 10, 1992 | [JP] | Japan | 4-299027 |

[51] Int. Cl.$^5$ ............ G02B 6/34; G02B 6/32
[52] U.S. Cl. ............ 359/341; 385/34; 385/47; 372/703
[58] Field of Search ........... 359/129, 163, 168, 341; 385/14, 34, 47; 250/227.24; 372/703

[56] References Cited

U.S. PATENT DOCUMENTS

| 4,714,313 | 12/1987 | Kapary et al. | 359/129 |
| 4,770,505 | 9/1988 | Okazaki | 359/341 |
| 5,044,713 | 9/1991 | Mozer et al. | 385/11 |
| 5,082,343 | 1/1992 | Coult et al. | 385/34 |
| 5,125,053 | 6/1992 | Abe et al. | 385/36 |
| 5,175,780 | 12/1992 | Sano et al. | 385/47 |
| 5,199,088 | 3/1993 | Magel | 385/47 |
| 5,268,910 | 12/1993 | Hube | 372/703 |

FOREIGN PATENT DOCUMENTS

| 58-48019 | 3/1983 | Japan . |
| 8115948 | 7/1983 | Japan . |
| 59-28116 | 2/1984 | Japan . |
| 1-155228 | 6/1989 | Japan . |
| 2-311829 | 12/1990 | Japan . |
| 3059547 | 3/1991 | Japan . |
| 4-104218 | 4/1992 | Japan . |
| 4106976 | 4/1992 | Japan . |

OTHER PUBLICATIONS

"Integrated Optical Module for Er-doped Fiber Amplifiers" in Spring Meeting of Japanese Society of Electronic Data Communication in 1992 (C-262).
"A polarization coupler with a WDM filter and a polarization independent optical isolator" in Spring Meeting of Japanese Society of Electronic Data Communication in 1991 (B-964).
"Optical Surface Mount Device" in Spring Meeting of Japanese Society of Electronic Data Communication in 1991 (C-263).
"Integrated Optical Device and WDM", PBS and Isolator, in Spring Meeting of Japanese Society of Electronic Data Communication in 1991 (C-264).

*Primary Examiner*—Nelson Moskowitz
*Attorney, Agent, or Firm*—Wenderoth, Lind & Ponack

[57] ABSTRACT

Optical passive components comprising: a first optical fiber for outputting pumping light; a second optical fiber for receiving the pumping light and either outputting or receiving signal light; a third optical fiber for either receiving or outputting the signal light; a wavelength selecting filter which transmits therethrough the pumping light and reflects the signal light; a mirror which reflects most of the signal light reflected by the wavelength selecting filter and transmits therethrough a portion of the signal light reflected by the wavelength selecting filter such that the wavelength selecting filter and the mirror form an optical assembly; an optical isolator which passes therethrough the signal light reflected by the mirror so as to output the signal light; and a semiconductor optical detecting device for detecting the signal light transmitted through the mirror; wherein the first, second and third optical fibers are disposed at one side of the optical assembly.

8 Claims, 8 Drawing Sheets

OPTICAL PASSIVE COMPONENTS

BACKGROUND OF THE INVENTION

The present invention relates to optical passive components for use in an optical fiber amplifier.

In a known optical fiber amplifier, pumping light having a wavelength of 1480 nm, for example, is incident upon an erbium-doped optical fiber so as to excite erbium atoms to high energy level. When signal light having a wavelength in the vicinity of 1550 mn is incident upon this excited erbium-doped optical fiber, stimulated emission and radiation of an identical wavelength proportional to magnitude of the signal light occurs so as to amplify the signal light. In order to excite the optical fiber amplifier, it is possible to use a front pumping method in which the pumping light is incident upon the erbium-doped optical fiber in a direction identical with that of propagation of the signal light, a rear pumping method in which the pumping light is incident upon the erbium-doped Optical fiber in a direction opposite to that of propagation of the signal light or a bidirectional pumping method in which the pumping light is incident upon the erbium-doped optical fiber both in the direction of propagation of the signal light and in its opposite direction. The front pumping method is effective for reducing noise figure (NF) and the rear pumping method is suitable for a case in which high output should be obtained. Meanwhile, the bidirectional pumping method has performance intermediate between those of the front pumping method and the rear pumping method. These pumping methods are selectively used on the basis of specifications such as amplification output, input power, gain, NF, etc. and required performance.

The known optical fiber amplifier is basically constituted by a pumping light source, a wavelength optical multiplexer, a non-polarized light type optical isolator and an erbium-doped optical fiber. In the optical fiber amplifier, as input power of pumping light to the erbium-doped optical fiber is increased, the input signal is amplified further. Thus, in case high output should be obtained, polarized light coupling is performed by using two pumping light sources.

Conventionally, as proposed in a paper (C-262) entitled "Integrated Optical Module for Er-doped Fiber Amplifiers" in Spring Meeting of Japanese Society of Electronic Data Communication in 1992, seven Optical functions, i.e. a polarized light coupler, a wavelength optical multiplexer, an optical isolator, a band-pass filter (BPF) for cutting natural light, two kinds of non-polarized light couplers for monitoring and a photodiode are integrated as an optical passive component for use in an optical fiber amplifier for rear pumping. By polarized light coupling function of this prior art optical passive component, two pumping light beams proceeding at right angles are coupled by a polarized beam splitter (PBS) and the coupled light beam is reflected by a wavelength selecting filter so as to be outputted to the erbium-doped optical fiber. On the other hand, signal light amplified by the erbium-doped optical fiber is passed through the wavelength selecting filter so as to be outputted through such optical components as the optical isolator, the band-pass filter (BPF) and the first non-polarized light coupler for monitoring arranged sequentially. A portion of light, which is reflected by the first non-polarized light coupler for monitoring, is reflected by the second non-polarized light coupler for monitoring so as to be carried to the photodiode. Furthermore, a portion of light, which has been passed through the second non-polarized light coupler for monitoring, is fed, as a monitoring output, to the optical fiber.

However, since input and output optical fibers extend from the prior art optical passive component in opposite directions, a large area is required for mounting the prior art optical passive component including laying of the optical fibers. As a result, the known optical fiber amplifier employing this optical passive component also becomes large in size undesirably. Furthermore, since monitoring function is performed at the last stage including the optical isolator and the band-pass filter, it is not easy to discriminate between failure of the optical amplifier portion and failure of the optical isolator or the band-pass filter. In addition, if the known optical passive component is used for the front pumping method, structural design based on new layout of the optical components is required to be performed, which is uneconomical.

SUMMARY OF THE INVENTION

Accordingly, an essential object of the present invention is to provide compact and low-loss optical passive components for use in an optical fiber amplifier, in which the number of optical components is reduced such that the optical fiber amplifier is made compact.

In order to accomplish this object of the present invention, optical passive components according to one embodiment of the present invention comprise: a first optical fiber for outputting pumping light; a second optical fiber for receiving the pumping light and either outputting or receiving signal light; a third optical fiber for either receiving or outputting the signal light; a wavelength selecting filter which transmits therethrough the pumping light and reflects the signal light; a mirror which reflects most of the signal light reflected by the wavelength selecting filter and transmits therethrough a portion of the signal light reflected by the wavelength selecting filter such that the wavelength selecting filter and the mirror form an optical assembly; an optical isolator which passes therethrough the signal light reflected by the mirror so as to output the signal light; and a semiconductor optical detecting device for detecting the signal light transmitted through the mirror; wherein the first, second and third optical fibers are disposed at one side of the optical assembly.

In order to lessen effects of polarized light on transmission characteristics, it is preferable that an incident angle relative to the wavelength selecting filter and the mirror is set to 22.5°.

By the above described arrangement of the optical passive components of the present invention, the pumping light passed through the wavelength selecting filer is initially incident upon an amplifying optical fiber such as an erbium-doped optical fiber. Then, the signal light amplified by the pumping light is reflected by the wavelength selecting filter is incident upon the mirror which reflects most of the signal light and transmits therethrough a portion of the signal light. The semiconductor optical detecting device receives the signal light transmitted through the mirror so as to monitor an amplification signal. Meanwhile, the signal light reflected by the mirror is passed through the optical isolator so as to be outputted.

Thus, the first to third optical fibers are disposed at one side of the optical assembly. Therefore, since degree of freedom in mounting the optical passive components on the optical fiber amplifier is increased and area required for laying the optical fibers can be reduced, the optical fiber amplifier can be made compact.

Meanwhile, since the amplification signal is monitored prior to its incidence upon the optical isolator, it can be easily judged that if a failure happens, the failure is caused by error of the amplifying portion.

Furthermore, by merely shifting positions of the optical isolator and the semiconductor optical detecting device, the optical passive components can be easily set to rear pumping type and front pumping type selectively, which is economical.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
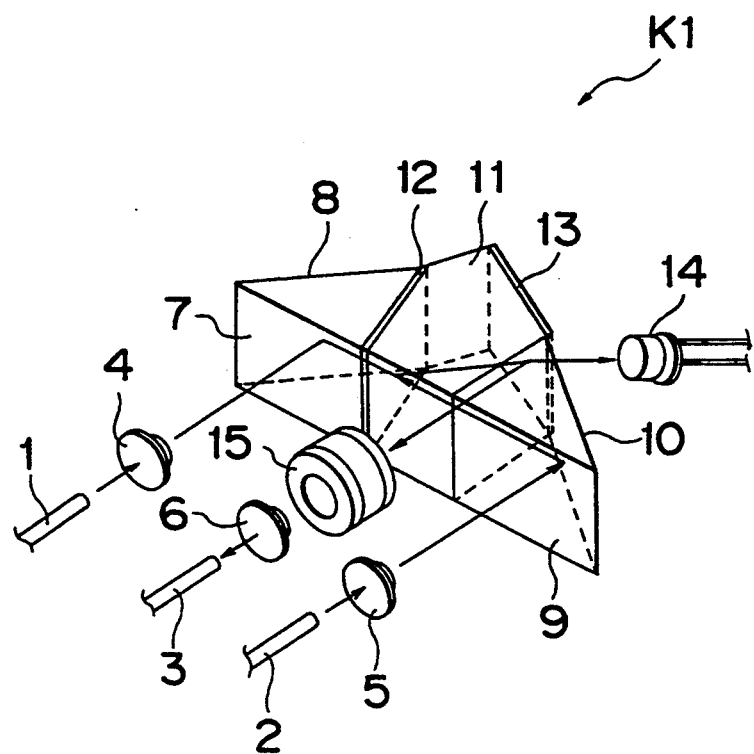
FIG. 1 is a perspective view of optical passive components used for rear pumping, according to a first embodiment of the present invention.
Figure 2:
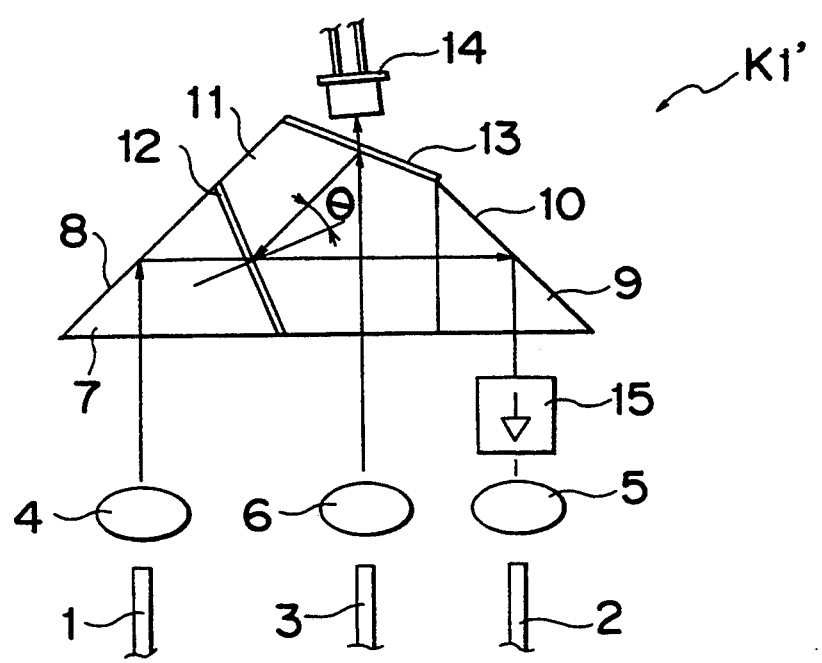
FIG. 2 is a top plan view similar to FIG. 1, particularly showing its modification for front pumping.

Referring now to the drawings, there is shown in FIG. 1, rear pumping type optical passive components K1 for use in an optical fiber amplifier, according to a first embodiment of the present invention. The optical passive components K1 include an optical fiber 1 for outputting pumping light having a wavelength of 1480 nm, an optical fiber 2 which receives the pumping light and outputs amplified signal light having a wavelength of 1550 nm, an optical fiber 3 for receiving the signal light, lenses 4, 5 and 6 which convert input light from the optical fibers 1 to 3 into collimated rays or concentrate collimated rays on the optical fibers 1 to 3, a transparent glass block 7, a rectangular prism 9 and a pentagonal prism 11 having a vertical angle of 45°. The glass block 7 has a reflecting surface 8 for changing optical path of the pumping light orthogonally, while the rectangular prism 9 has a reflecting surface 10 for changing optical paths of the pumping light and the signal light orthogonally in opposite directions on an identical optical axis. Opposite sides of the vertical angle of the pentagonal prism 11 have, respectively, a wavelength selecting filter 12 which partially not only transmits therethrough light having a wavelength of 1480 nm but reflects light having a wavelength of 1550 nm and a mirror 13 which reflects most of light having a wavelength of 1550 nm and transmits therethrough a portion of the light having a wavelength of 1550 nm. The wavelength selecting filter 12 is formed by an interference film made of dielectric material. When incident angle is increased, transmittance characteristics of the wavelength selecting filter 12 deteriorate due to polarization. Thus, as shown in FIG. 2, an incident angle $\theta$ is set to 22.5° which is less subjected to influence of polarization.

The optical passive components K1 further include a semiconductor optical detecting device 14 for detecting a portion of the signal light and an optical isolator 15 for shielding light in the opposite direction. The optical isolator 15 is disposed between the pentagonal prism 11 and the lens 6. The elements 7 to 13 form a main optical assembly and the optical fibers 1 to 3 are disposed at one side of the main optical assembly.

Hereinbelow, operation of the optical passive components K1 of the above described arrangement is described. Light of 1480 nm in wavelength guided from a pumping light source is outputted from the optical fiber 1 and is converted into collimated rays by the lens 4. Then, optical path of the collimated rays outputted from the lens 4 is changed orthogonally by the reflecting surface 8 of the glass block 7 such that the collimated rays are incident upon the wavelength selecting filter 12. Subsequently, optical path of the light transmitted through the wavelength selecting filter 12 is changed orthogonally by the reflecting surface 10 of the rectangular prism 9 such that the light is incident upon the lens 5. Thereafter, the light incident upon the lens 5 is converged to the optical fiber 2 and is carried to an amplifying optical fiber such as an erbium-doped optical fiber.

On the other hand, the signal light of 1550 nm in wavelength amplified by the amplifying optical fiber is outputted from the optical fiber 2 and is incident upon the lens 5 in which the signal light is converted into collimated rays. Then, optical path of the collimated rays is changed orthogonally by the reflecting surface 10 of the the rectangular prism 9 such that the collimated rays are incident upon the wavelength selecting filter 12. The collimated rays reflected by the wavelength selecting filter 12 are incident upon the mirror 13. Subsequently, a portion of the light is transmitted through the mirror 13 so as to be received by the semiconductor optical detecting device 14. In the semiconductor optical detecting device 14, the amplified signal light is detected such that amplified output can be controlled. Most of the light is reflected by the mirror 13 and is outputted in a direction orthogonal to the direction of travel of the light ray incident upon the wavelength selecting filter 12 through the optical isolator 15. Output light from the lens 6 is converged to the optical fiber 3.

In the optical passive components K1, since the optical fibers 1 to 3 are disposed at one side of the main optical assembly constituted by the elements 7 to 13 as described above, the optical passive components K1 can be made compact. Therefore, when the optical passive components K1 are mounted on the optical fiber amplifier, the optical passive components K1 can be disposed at a corner of the optical fiber amplifier and thus, the optical fiber amplifier also can be made compact.

Meanwhile, since the amplified output can be monitored prior to its incident upon the optical isolator, it is possible to discriminate between failure of the amplifier and failure of the optical isolator 15.

Furthermore, merely by placing the optical isolator 15 at the input side of the pumping light and slightly displacing the semiconductor optical-detecting device 14 from its position in the rear pumping type optical passive components K1, the rear pumping type optical passive components K1 can be easily changed to front pumping type optical passive components K1' as shown in FIG. 2. In FIG. 2, the optical isolator 15 is disposed between the rectangular prism 9 and the lens 5 such that the signal light prior to amplification is outputted from the optical fiber 3 to the optical isolator 15. Meanwhile, in FIG. 2, since the incident direction of the signal light relative to the mirror 13 is opposite to that of rear pumping, the semiconductor optical detecting device 14 is slightly displaced from its position in the optical passive components K1. Since other constructions of the optical passive components K1' are similar to those of the optical passive components K1, description thereof is abbreviated for the sake of brevity.

Operation of the optical passive components K1' of the above described arrangement is described briefly, hereinbelow. Pumping light outputted from the optical fiber 1 is transmitted through the glass block 7, the wavelength selecting filter 12 and the rectangular prism 9 so as to be incident upon the optical isolator 15. Meanwhile, signal light outputted from the optical fiber 3 is partially transmitted through the mirror 13 so as to be received by the semiconductor optical detecting device 14 for the purpose of detecting presence and absence of error of the signal light. Most of the signal light is reflected by the mirror 13 and then, is reflected by the wavelength selecting filter 12 so as to be incident upon the optical isolator 15 along an optical path identical with that of the pumping light. The pumping light and the signal light which have passed through the optical isolator 15 are concentrated on the optical fiber 2 by the lens 5. Although the pumping light and the signal light having different wavelengths pass through the optical isolator 15, the wavelengths of the pumping light and the signal light are approximate to each other and thus, substantially no loss is incurred. As described above, by merely changing layout of a portion of the elements of the optical passive components K1 for rear pumping, the optical passive components K1' for front pumping can be easily obtained.

Figure 3:
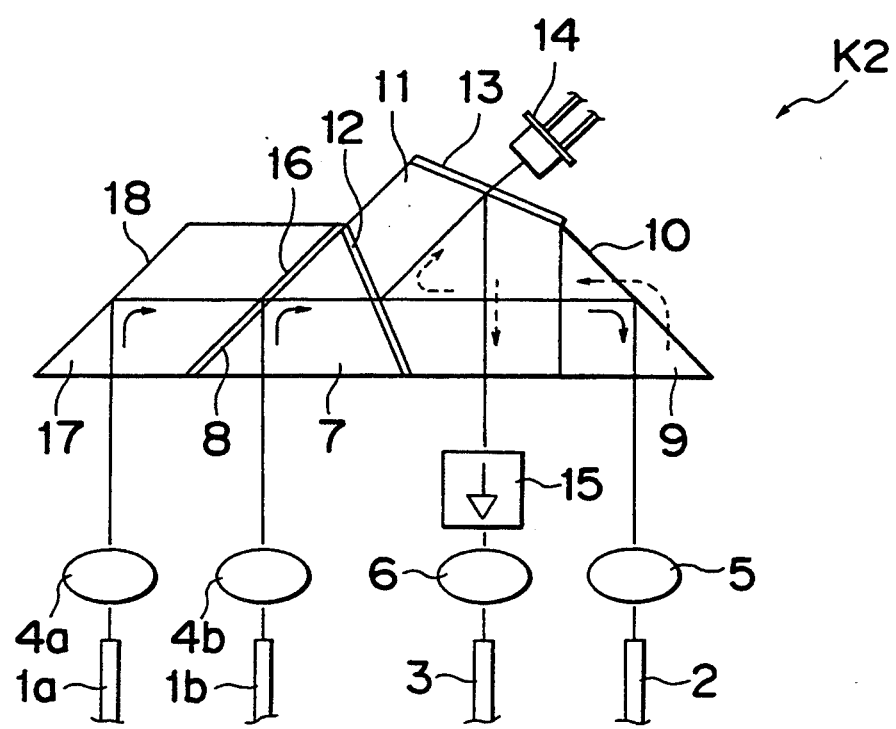
FIG. 3 is a top plan view of optical passive components used for rear pumping, according to a second embodiment of the present invention.

FIG. 3 shows rear pumping type optical passive components K2 according to a second embodiment of the present invention. In the optical passive components K2, polarized light coupling function is provided so as to increase input power of pumping light. The optical passive components K2 include polarization maintained optical fibers 1a and 1b for guiding linearly polarized light from a pumping light source while maintaining a plane of polarization, lenses 4a and 4b for converting output light rays from the polarization maintained optical fibers 1a and 1b into the collimated rays, respectively, a polarized light coupling film 16 for coupling two linearly polarized light rays intersecting with each other at right angles and a parallelogrammatic prism 17 having a reflecting surface 18. The polarized light coupling film 16 is provided on the glass block 7. Optical path of the linearly polarized light outputted from the lens 4a is changed orthogonally by the parallelogrammatic prism 17 such that the linearly polarized light has an optical axis identical with the linearly polarized light reflected by the polarized light coupling film 16. Since other constructions of the optical passive components K2 are similar to those of the optical passive components K1, description thereof is abbreviated for the sake of brevity.

Operation of the optical passive components K2 of the above described arrangement is described briefly, hereinbelow. The linearly polarized light rays outputted from the polarization maintained optical fibers 1a and 1b are converted into the collimated rays by the lenses 4a and 4b, respectively. Optical path of the linearly polarized light outputted from the lens 4a is changed orthogonally by the reflecting surface 18 of the parallelogrammatic prism 17 such that the linearly polarized light is incident upon the polarized light coupling film 16. On the other hand, the linearly polarized light converted into the collimated rays by the lens 4b is also incident upon the polarized light coupling film 16. The two linearly polarized light rays incident upon the polarized light coupling film 16 from the lenses 4a and 4b have planes of polarization intersecting with each other at right angles and are coupled with each other by the polarized light coupling film 16 so as to be outputted from the polarized light coupling film 16. The coupled pumping light is concentrated on the optical fiber 2 through the wavelength selecting filter 12, the rectangular prism 9 and the lens 5.

By the above described arrangement of the optical passive components K2, the light rays from the two pumping light sources can be coupled with each other and amplification degree of the signal light can be increased. Furthermore, in the same manner as in the optical passive components K1 of FIG. 1, the optical fibers 1a, 1b, 2 and 3 are disposed at one side of the main optical assembly and thus, the optical passive components K2 can be also made compact. It is needless to say that merely by changing the positions of the optical isolator 15 and the semiconductor optical detecting device 14 in the rear pumping type optical passive components K2 as shown in FIG. 2, the optical passive components K2 can be easily changed to front pumping type optical passive components.

Figure 4:
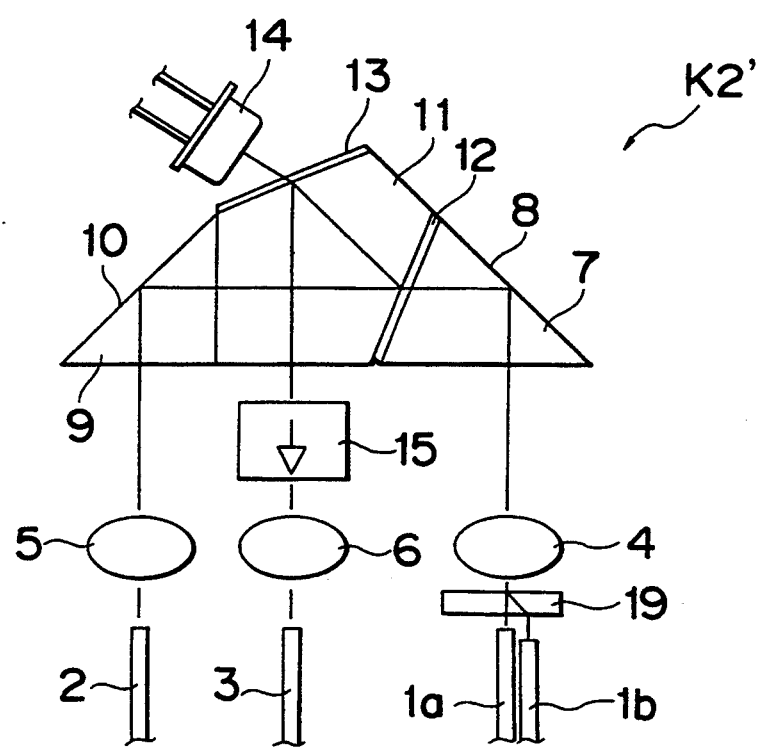
FIG. 4 is a view similar to FIG. 3, particularly showing its first modification for rear pumping.

FIG. 4 shows rear pumping type optical passive components K2' which are a first modification of the optical passive components K2. In order to perform polarized light coupling in the optical passive components K2', the polarized light coupling film 16 of the optical passive components K2 is replaced by a rutile crystal element 19 acting as a birefringent crystal element. The rutile crystal element 19 is provided between the lens 4 and the polarization maintained optical fibers 1a and 1b. The rutile crystal element 19 has a function of dividing input light into two linearly polarized light rays having planes of polarization intersecting with each other at right angles and can change the divisional distance by thickness of the rutile crystal element 19. Since other constructions of the optical passive components K2' are similar to those of the optical passive components K2, description thereof is abbreviated for the sake of brevity.

Operation of the optical passive components K2' of the above described arrangement is described briefly, hereinbelow. Initially, the linearly polarized pumping light rays guided by the polarization maintained optical fibers 1a and 1b are incident upon the rutile crystal element 19. Directions of polarization of the linearly polarized pumping light rays are determined such that the light rays outputted from the optical fibers 1a and 1b act as an ordinary ray and an extraordinary ray in the rutile crystal element 19, respectively. The ordinary ray proceeds in the rutile crystal element 19 linearly. On the other hand, the extraordinary ray proceeds in the rutile crystal element 19 obliquely and is outputted from a position of the futile crystal element 19, which deviates from a position of output of the ordinary ray from the rutile crystal element 19 through a predetermined distance proportional to thickness of the rutile crystal element 19. The polarization maintained optical fibers 1a and 1b are disposed such that optical axes of the output light rays from the optical fibers 1a and 1b coincide with each other at an output end face of the rutile crystal element 19. The pumping light rays from the optical fibers 1a and 1b are coupled with each other by the rutile crystal element 19 so as to be converted into the collimated rays by the lens 4. The output light from the lens 4 is concentrated on the optical fiber 2 via the glass block 7, the wavelength selecting filter 12, the rectangular prism 9 and the lens 5.

Since focal points of the ordinary ray and the extraordinary ray deviate from each other slightly, it desirable that an end face of the optical fiber 1b is longitudinally spaced away from that of the optical fiber 1a. In this embodiment, since polarized light coupling is performed by the birefringent crystal such as the rutile crystal element 19 acting also as a lens, the optical passive components K2' can be made compact. Furthermore, in the same manner as in the optical passive components K1 of FIG. 1, the optical fibers 1a, 1b, 2 and 3 are disposed at one side of the main optical assembly and thus, the optical passive components K2' can be also made compact. It is needless to say that merely by changing the positions of the optical isolator 15 and the semiconductor optical detecting device 14 in the rear pumping type optical passive components K2' as shown in FIG. 2, the optical passive components K2' can be easily changed to front pumping type optical passive components.

Figure 5:
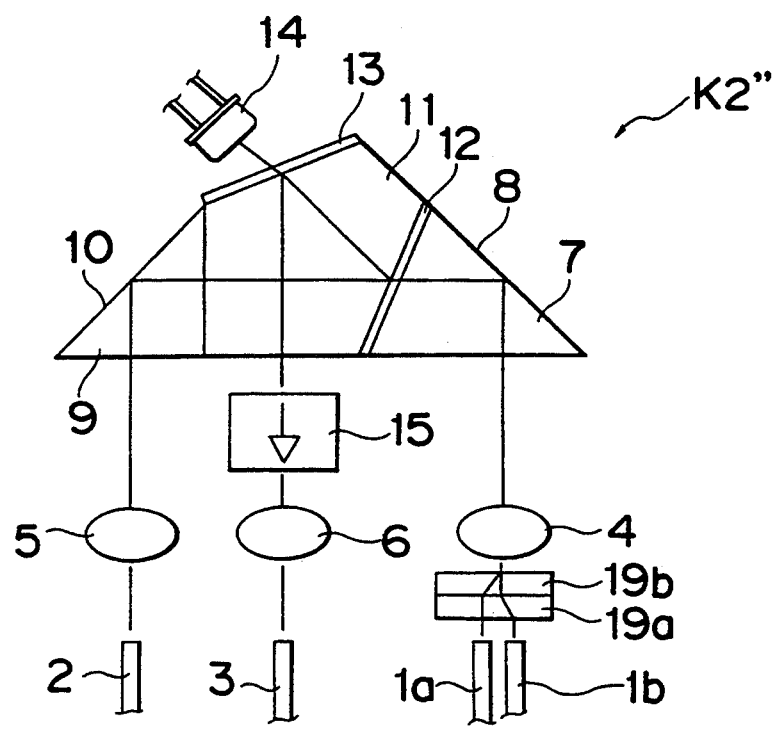
FIG. 5 is a view similar to FIG. 3, particularly showing its second modification for rear pumping.
Figure 6:
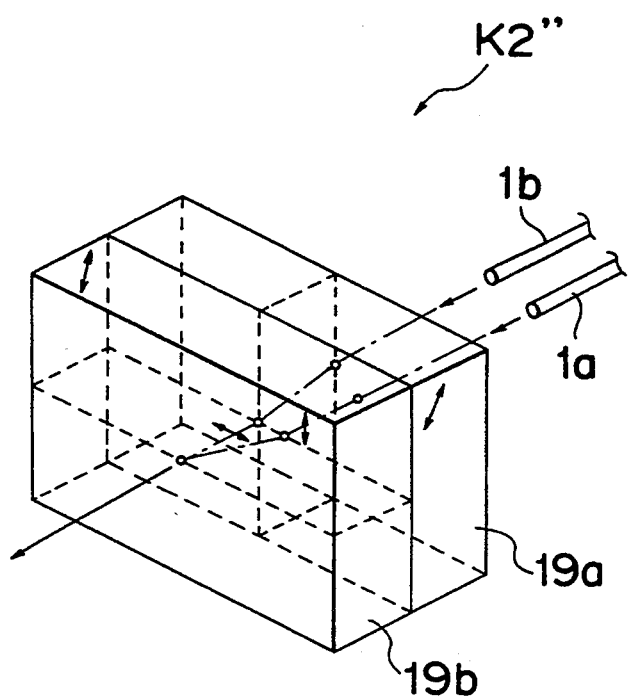
FIG. 6 is a fragmentary perspective view of FIG. 5.

FIG. 5 shows rear pumping type optical passive components K2'' which are a second modification of the optical passive components K2. In order to perform polarized light coupling in the optical passive components K2'', the futile crystal element 19 of the optical passive components K2' is replaced by futile crystal elements 19a and 19b which have crystalline optical axes intersecting with each other at right angles. In the optical passive components K2, the rutile crystal elements 19a and 19b are provided between the lens 4 and the polarization maintained optical fibers 1a and 1b. When the rutile crystal elements 19a and 19b having the crystalline optical axes intersecting with each other at right angles are bonded to each other, the two linearly polarized light rays are coupled with each other as shown in FIG. 6. In FIG. 6, the linearly polarized light outputted from the optical fiber 1a proceeds linearly as an ordinary ray in the rutile crystal element 19a but travels obliquely as an extraordinary ray in the futile crystal element 19b having the crystalline optical axis intersecting with that of the rutile crystal element 19a at right angles. Meanwhile, the linearly polarized light which is outputted from the optical fiber 1b and intersects with the linearly polarized light from the optical fiber 1a travels obliquely as an extraordinary ray in the rutile crystal element 19a but proceeds linearly as an ordinary ray in the futile crystal element 19b. Therefore, the two linearly polarized light rays from the optical fibers 1a and 1b have an identical optical path length and thus, are coupled with each other at the end face of the rutile crystal element 19b. Meanwhile, a distance between the optical fibers 1a and 1b is set to such a value that the inputted ordinary and extraordinary rays are coupled with each other at the end face of the futile crystal element 19b.

As shown in FIG. 5, the coupled light is converted into collimated rays by the lens 4 and the collimated rays are concentrated on the optical fiber 2 via the glass block 7, the wavelength selecting filter 12, the rectangular prism 9 and the lens 5.

In this arrangement of the optical passive components K2'', by employing the two birefringent crystal elements having the crystalline optical axes intersecting with each other at right angles, the light rays outputted from the polarization maintained optical fibers 1a and 1b are coupled with each other by way of the states of the ordinary and extraordinary rays. As a result, positions of focal points of the light rays outputted from the optical fibers 1a and 1b coincide with each other for the lens 4, so that the end faces of the optical fibers 1a and 1b can be so disposed as to coincide with each other. Meanwhile, in the same manner as in the optical passive components K1 of FIG. 1, the optical fibers 1a, 1b, 2 and 3 are disposed at one side of the main optical assembly. Furthermore, it is needless to say that merely by changing the positions of the optical isolator 15 and the semiconductor optical detecting device 14 as shown in FIG. 2, the rear pumping type optical passive components K2'' can be easily changed to front pumping type optical passive components.

Figure 7:
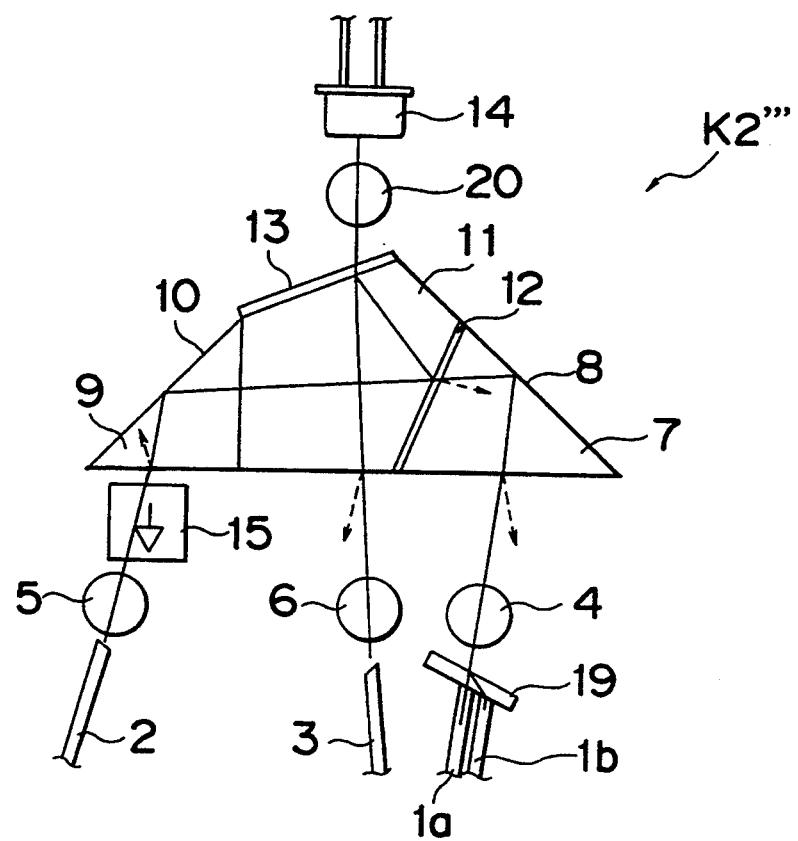
FIG. 7 is a view similar to FIG. 3, particularly showing its third modification for front pumping.

FIG. 7 shows front pumping type optical passive components K2''' which are a third modification of the optical passive components K2. In the optical passive components K2''', the end faces of the polarization maintained optical fibers 1a and 1b are polished obliquely at an angle of about 8° so as to be attached to the futile crystal element 19. Furthermore, the end faces of the output and input optical fibers 2 and 3 for the signal light are also polished obliquely. In order to restrain reflected back light, spherical lenses 4, 5 and 6 are employed as lenses for converting the light from the optical fibers 1a, 1b, 2 and 3 into the collimated rays or concentrating the collimated rays on the optical fibers 1a, 1b, 2 and 3. Furthermore, in order to prevent such a phenomenon in which the light rays outputted from the lenses 4 to 6 are reflected on the incident surfaces of the glass block 7, the pentagonal prism 11 and the rectangular prism 9 so as to travel backwardly, the spherical lenses 4 to 6 are disposed such that the light rays having passed through the lenses 4 to 6 are not perpendicular to the incident surfaces of the glass block 7, the pentagonal prism 11 and the rectangular prism 9. Meanwhile, a spherical lens 20 for concentrating a portion of the collimated signal light, which has been transmitted through the mirror 13 is disposed forwardly of the semiconductor optical detecting device 14.

By this arrangement of the optical passive components K2''', since reflected back light in the optical path can be restrained, performance of the optical fiber amplifier can be upgraded. Furthermore, difference in position of the focal point between the ordinary and extraordinary rays can be corrected by the rutile crystal element 19 and difference in coupling efficiency between the ordinary and extraordinary rays can be reduced by the single rutile crystal element 19. Meanwhile, it goes without saying that merely by changing the positions of the optical isolator 15, the semiconductor optical detecting device 14 and the lens 20, the front pumping type optical passive components K2 can be easily changed to rear pumping type optical passive components.

Figure 8:
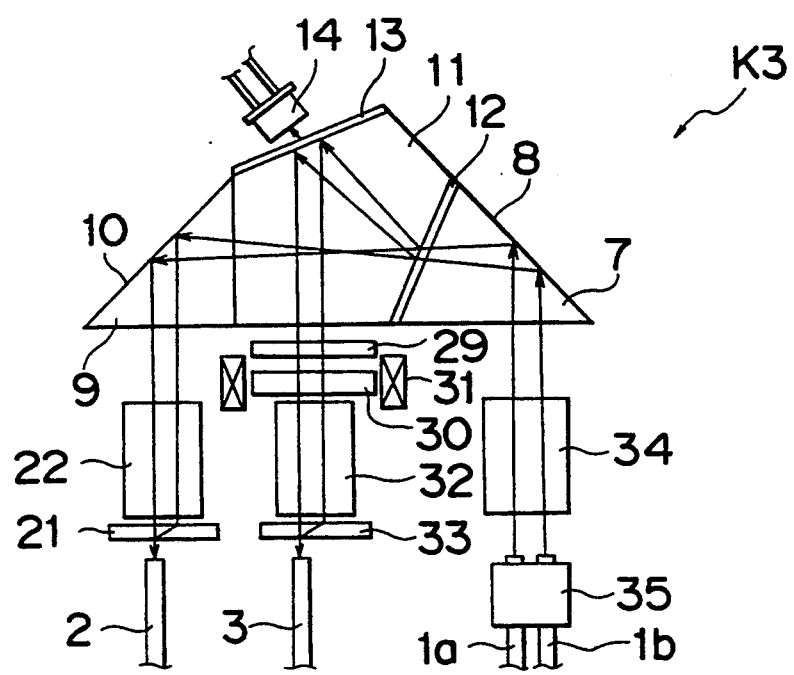
FIG. 8 is a top plan view of optical passive components used for rear pumping, according to a third embodiment of the present invention.

FIG. 8 shows rear pumping type optical passive components K3 according to a third embodiment of the present invention. The optical passive components K3 include a birefringent crystal element 21 such as a futile crystal element for dividing input light into two linearly polarized light rays having planes of polarization intersecting with each other at right angles, a first grin rodlens 22 for converting input light into collimated rays, a half-wave plate 29 for reversibly rotating a plane of polarization of input light through about 45° by rotational crystal, a magnetooptical crystal element 30 for unreversibly rotating the plane of polarization under the influence of magnetic field of a magnet 31, a second grin rodlens 32 for converging inputted collimated rays and a birefringent crystal element 33 identical with the birefringent crystal element 21, which couples on an identical optical axis the two linearly polarized light rays having the planes of polarization intersecting with each other at right angles. The optical passive components K3 further include a third grin rodlens 34 for converting input light into collimated rays and an optical fiber array 35. The end faces of the optical fibers 2 and 3 are polished obliquely at an angle of 8° so as to lessen reflected back light at the end faces of the optical fibers 2 and 3. In the optical fiber array 35, distal end portions of the polarization maintained optical fibers 1a and 1b are arranged so as to be secured and the end faces of the optical fibers 1a and 1b are polished obliquely at an angle of 8°.

Operation of the optical passive components K3 is described, hereinbelow. Initially, light having a wavelength of 1550 nm is incident upon the birefringent crystal element 21 from the optical fiber 2 so as to be divided into two linearly polarized light rays having planes of polarization intersecting with each other at right angles. The two linearly polarized light rays are incident upon the first grin rodlens 22 at locations symmetric with respect to a line deviating slightly from the central axis of the first grin rodlens 22. At the other end of the first grin rodlens 22, the linearly polarized light rays are converted into nearly collimated rays. Then, optical paths of the nearly collimated rays are changed substantially orthogonally by the reflecting surface 10 of the rectangular prism 9 and then, the nearly collimated rays are incident upon the wavelength selecting filter 12. The wavelength selecting filter 12 is formed by a dielectric interference film which is arranged to reflect light having a wavelength of 1550 nm and transmit therethrough light having a wavelength of 1480 nm. Therefore, the wavelength selecting filter 12 reflects the nearly collimated rays so as to divert the optical axes of the nearly collimated rays such that the nearly collimated rays are incident upon the mirror 13. A portion of the light is transmitted through the mirror 13 and is incident upon the semiconductor optical detecting device 14 so as to be monitored by the semiconductor optical detecting device 14.

Meanwhile, most of the light is reflected by the mirror 13 so as to be incident upon the half-wave plate 29. The half-wave plate 29 is adapted to rotate plane of polarization of input light through 45°. Therefore, the planes of polarization of the two reflected linearly polarized light rays are rotated through about 45° by the half-wave plate 29 such that the linearly polarized light rays are incident upon the magnetooptical crystal element 30. The magnetooptical crystal element 30 is adapted to unreversibly rotate a plane of polarization of input light through about 45° under the influence of magnetic field of the magnet 31. Thus, the two linearly polarized light rays are rotated through about 45° by the magnetooptical crystal element 30 in the same direction as that in which the two linearly polarized light rays are rotated by the half-wave plate 29. Therefore, in comparison with a polarized light condition immediately after output of the two linearly polarized light rays from the birefringent crystal element 21, the planes of polarization of the two linearly polarized light rays have undergone a change of about 90°.

The two linearly polarized light rays outputted from the magnetooptical crystal element 30 are incident upon the second grin rodlens 32 and are converged so as to be focussed, in the vicinity of the other end of the second grin rodlens 32, on two points symmetric with respect to a line deviating slightly from the central axis of the second grin rodlens 32. Subsequently, the birefringent crystal element 33 is provided for coupling on an identical optical path two linearly polarized light rays having planes of polarization intersecting with each other at right angles. Therefore, as shown in FIG. 8, the two linearly polarized light rays are coupled by the birefringent crystal element 33 so as to be outputted.

On the other hand, light proceeding in the direction opposite to that of the output light is divided by the birefringent crystal element 33 into two linearly polarized light rays intersecting with each other at right angles so as to be incident upon the magnetooptical crystal element 30. The planes of polarization of the two linearly polarized light rays are rotated through 45° in the regular direction by the magnetooptical crystal element 30 and then, are rotated through 45° in the direction opposite to the regular direction by the half-wave plate 29. As a result, since the planes of polarization of the two linearly polarized light rays incident upon the birefringent are different by 90° from those in the regular direction, the two linearly polarized light rays are not coupled with each other by the birefringent crystal element 21 so as to be outputted from an optical axis different from that of the input light. By the above described operation, an optical isolator independent of polarization is formed in which the light in the regular direction is divided for polarization between the birefringent crystal elements 21 and 33 but the light in the opposite direction is intercepted.

Subsequently, two linearly polarized light rays having a wavelength of 1480 nm and planes of polarization intersecting with each other at right angles are incident from the polarization maintained optical fibers 1a and 1b upon the third grin rodlens 34 at locations symmetric with respect to a line deviating slightly from the central axis of the third grin rodlens 34 so as to be converted into nearly collimated rays by the third grin rodlens 34. Thereafter, the nearly collimated rays are reflected by the reflecting surface 8 of the glass block 7 so as to be incident upon the wavelength selecting filter 12. Since the wavelength selecting filter 12 transmits therethrough light having a wavelength of 1480 nm, optical paths of the linearly polarized light rays are changed substantially orthogonally by the reflecting surface of 10 of the rectangular prism 9 such that the linearly polarized light rays are incident upon the first grin rodlens 22. In the first grin rodlens 22, the linearly polarized light rays travel on optical axes identical with those of the light having a wavelength of 1550 nm and have planes of polarization identical with those of the light having a wavelength of 1550 nm.

Then, the linearly polarized light rays are coupled with each other on an optical axis identical with that of the input light by the birefringent crystal element 21 so as to be outputted to the optical fiber 21. Meanwhile, the locations of incidence of the linearly polarized light rays upon the third grin rodlens 34 and the directions of the planes of polarization of the linearly polarized light rays are set such that when the linearly polarized light rays are coupled with each other by the birefringent crystal element 21 through the wavelength selecting filter 12, the coupled light is outputted on the optical axis identical with that of the input light. More specifically, the locations of incidence of the linearly polarized light rays upon the third grin rodlens 34 and the directions of the planes of polarization of the linearly polarized light rays are set such that the light rays of 1480 nm in wavelength incident from the birefringent crystal element 21 as the input light are converged, through the wavelength selecting filter 12, to the two locations by the third grin rodlens 34. By the above described operation, the linearly polarized light rays having a wavelength of 1480 nm are coupled with each other so as to be coupled with the light having a wavelength of 1550 nm. As a result, the optical passive components K3 have functions of a polarized light coupler and an optical wavelength multiplexer.

In this embodiment, the half-wave plate 29 and the magnetooptical crystal element 30 are provided between the pentagonal prism 11 and the second grin rodlens 32 but may also be disposed between the first grin rodlens 22 and the rectangular prism 9.

By this arrangement of the optical passive components K3, since the birefringent crystal element for polarized light coupling acts also as a birefringent crystal element for an optical isolator, the number of the components can be reduced and thus, the optical passive components K3 can be made compact. Furthermore, since the optical fibers 1a, 1b, 2 and 3 are disposed at one side of the main optical assembly, the optical fiber amplifier incorporating the optical passive components K3 also can be made compact.

What is claimed is:

1. Optical passive components comprising:
 a first optical fiber for outputting pumping light;
 a second optical fiber for receiving the pumping light and either outputting or receiving signal light;
 a third optical fiber for either receiving or outputting the signal light;
 a wavelength selecting filter which transmits therethrough the pumping light and reflects the signal light;
 a mirror which reflects most of the signal light reflected by the wavelength selecting filter and transmits therethrough a portion of the signal light reflected by the wavelength selecting filter such that the wavelength selecting filter and the mirror form an optical assembly;
 an optical isolator which passes therethrough the signal light reflected by the mirror so as to output the signal light; and
 a semiconductor optical detecting device for detecting the signal light transmitted through the mirror;
 wherein the first, second and third optical fibers are disposed at one side of the optical assembly.

2. Optical passive components as claimed in claim 1, further comprising:
 a polarized beam splitter which outputs on an identical optical axis two linearly polarized light rays having planes of polarization intersecting with each other at right angles so as to form coupled light.

3. Optical passive components as claimed in claim 2, wherein the polarized beam splitter is formed by a polarized light coupling film.

4. Optical passive components as claimed in claim 2, wherein the polarized beam splitter is formed by a birefringent crystal element.

5. Optical passive components as claimed in claim 2, wherein the polarized beam splitter is formed by two birefringent crystal elements having optical axes intersecting with each other at right angles.

6. Optical passive components as claimed in claim 4, wherein end faces of the first, second and third optical fibers are formed obliquely and the pumping light and the signal light are inputted to and outputted from the optical assembly obliquely relative to an incident surface of the optical assembly.

7. Optical passive components comprising:
 a first birefringent crystal element for dividing input light into two linearly polarized light rays having planes of polarization intersecting with each other at right angles;
 a first lens for converting the linearly polarized light rays into collimated rays;
 a wavelength selecting filter which, when the collimated rays are first collimated rays having a first wavelength, reflects the first collimated rays so as to divert optical axes of the first collimated rays and, when the collimated rays are second collimated rays having a second wavelength, transmits therethrough the second collimated rays;
 a mirror which reflects most of the first collimated rays reflected by the wavelength selecting filter and transmits therethrough a portion of the first collimated rays reflected by the wavelength selecting filter;
 a semiconductor optical detecting device for detecting the first collimated rays transmitted through the mirror;
 a second lens for converging the first collimated rays reflected by the mirror;
 a second birefringent crystal element for coupling on an identical optical axis the first collimated lens outputted from the second lens;
 a third lens for converging the second collimated rays transmitted through the wavelength selecting filter;
 a magnetooptical crystal element for unreversibly rotating a plane of polarization of the input light, which is provided at an arbitrary position on an optical path ranging from the first lens to the second lens; and
 a rotational crystal element for reversibly rotating the plane of polarization of the input light.

8. Optical passive components as claimed in claim 7, further comprising:
 a first optical fiber for outputting the second collimated rays;
 a second optical fiber for receiving the second collimated rays and either outputting or receiving the first collimated rays; and
 a third optical fiber for either receiving or outputting the first collimated rays;
 wherein the wavelength selecting filter and the mirror form an optical assembly such that the first, second and third optical fibers are disposed at one side of the optical assembly.

* * * * *